United States Patent [19]
Danilychev et al.

[11] Patent Number: 5,215,636
[45] Date of Patent: Jun. 1, 1993

[54] PULSED DISCHARGE SURFACE TREATMENT APPARATUS AND PROCESS

[75] Inventors: Vladimir A. Danilychev, Irvine; George Wakalopulos, Pacific Palisades, both of Calif.

[73] Assignee: American International Technologies, Inc., Torrance, Calif.

[21] Appl. No.: 767,145

[22] Filed: Sep. 27, 1991

[51] Int. Cl.$^5$ .............................................. B01J 19/08
[52] U.S. Cl. .................................. 204/164; 204/165; 422/186.05; 422/186.06
[58] Field of Search .............................. 204/164, 165; 422/186.05, 186.06; 427/39, 40, 41

[56] References Cited

U.S. PATENT DOCUMENTS

| | | | |
|---|---|---|---|
| 3,823,061 | 7/1974 | Frayer et al. | 161/254 |
| 4,072,769 | 2/1978 | Lidel | 427/38 |
| 4,301,352 | 11/1981 | Shipai et al. | 422/186.05 |
| 4,900,388 | 2/1990 | Wyslotsky | 156/272.6 |
| 4,940,521 | 7/1990 | Dinter et al. | 204/164 |
| 5,024,819 | 6/1991 | Dinter et al. | 204/164 |
| 5,026,463 | 6/1991 | Dinter et al. | 204/164 |

OTHER PUBLICATIONS

"Electrical, gasdynamic, and radiative properties of planar surface discharges", R. E. Beverly III, Journal of Applied Physics, vol. (60)1, 1 Jul. 1986, pp. 104-124.
"Plasma-surface Interactions in the Plasma Modification of Polymer Surfaces", H. K. Yasuda et al., Polymer Surfaces and Interfaces, John Wiley & Sons Ltd., 1987, Ch. 8, pp. 149-163.
"The Corona Discharge Treatment of Plastics Films", J. L. Linsley Hood, British Cellophane Limited, no date, pp. 86-90.

*Primary Examiner*—John Niebling
*Assistant Examiner*—Brian M. Bolam
*Attorney, Agent, or Firm*—Schneck & McHugh

[57] ABSTRACT

A pulsed surface discharge apparatus for treating dielectric surfaces, such as polymers, having a pair of electrodes spaced apart adjacent to a surface to be treated, means for supplying an inert gas, or a predominantly inert gas mixture, adjacent to the surface in the region between the electrodes, an electric pulse generator providing repeated pulses of a high voltage to the electrodes sufficient to cause breakdown of the inert gas and generate a discharge across the surface to be treated, and a dielectric surface transport for moving the surface to be treated past the electrodes. The electrodes and inert gas may be enclosed within a treatment chamber having entrance and exit ports for the material to be treated, and adapted for wire, rod, tube, sheet or other forms of dielectric material. One embodiment encloses the supply of dielectric material, which material drags inert gas along with to the discharge region. Material treatment by the surface discharge improves wettability of and adhesion to the dielectric surface due to the irradiation by intense uv or other electromagnetic radiation and bombardment by electrons, ions and excited gas species in the discharge.

39 Claims, 5 Drawing Sheets

PULSED DISCHARGE SURFACE TREATMENT APPARATUS AND PROCESS

DESCRIPTION

Technical Field

The present invention relates to electrical discharge plasma-generating apparatus adapted for the treatment of polymer materials, and also relates to the process of treating the surface of polymers.

Background Art

In U.S. Pat. No. 3,823,061, Freyer describes bonding two or more sheets of polymeric material using a corona discharge. The electrostatic discharge is generated by biasing a pair of electrodes up to 10 thousand volts, between which electrodes the plural sheets are fed at a relative slow speed of 6 ft/min (3 cm/s). Treatment was done at atmospheric pressure.

In U.S. Pat. No. 4,900,388, Wyslotsky describes laminating polymeric sheet material using a cylindrical apparatus housing three rollers which feed the sheet material to be treated into and out of a plasma reacting chamber. A gas in the chamber, such as argon, krypton or xenon, at approximately 1.1 torr (150 Pa) pressure is disassociated using extremely high voltages (exceeding 180,000 volts) modulated at 12.56 MHz. In the disclosed embodiment, razorlike elements on one side of the sheet material serve as the cathode and a conductive roller on the opposite side of the sheet material serves as the anode. The material moves past these electrodes at a very high rate of about 500 ft/s (150 m/s).

In U.S. Pat. No. 4,072,769, Lidel describes treating polymeric surfaces by exposure to reactive gas that has been activated by radio frequency electromagnetic radiation prior to being directed onto the surface. The resulting excited molecules and free radicals change the wettability of the polymer surface and improve adhesion characteristics of the surface.

Beverly, in the Journal of Applied Physics, vol. 60 (1), 1 Jul. 1986 pp 104–124 describes electrical, gas dynamic and radiative properties of planar surface discharges. The apparatus employed a fixed ceramic substrate on which the discharge was produced. The effects of the discharge on the substrate itself were not reported.

Yasuda et al., in "Polymer Surfaces and Interfaces", John Wiley & Sons Ltd., 1987, Ch. 8, pp. 149–163, describe the effects of plasma treatment on polymer surface and in particular of surface collisions by excited and ionized gas molecules and atoms on the treated surface.

An object of the invention is to provide a dielectric surface treatment apparatus using a plasma discharge which is highly efficient and does not require vacuum maintaining equipment.

SUMMARY OF THE INVENTION

The above object has been met with a method and apparatus for treating the surface of dielectric materials in which three electrodes are positioned to produce a surface discharge in a gas mixture near atmospheric pressure immediately adjacent to the dielectric surface. A transport delivers the dielectric material past the electrodes. The first and second electrodes are positioned spaced apart against the same side of the material surface with the third electrode positioned against the opposing side of the material surface, so that the discharge occurs uniformly distributed over a wide area of the surface between the first and second electrodes with current flow being substantially parallel to the surface. This is in contrast to prior arrangements that produced either a concentrated arc discharge or a volume corona effect. The gas mixture which is supplied at least to the dielectric material surface in the area between the first and second electrodes is a predominantly or entirely inert gas, generally at or slightly above atmospheric pressure. It may also include reactive gas components or monomers along with the inert gas. An electric pulse generator applies repeated voltage pulses across the electrodes with a voltage that exceeds the breakdown voltage of the gas mixture. The resulting surface discharge delivers high power density to the surface to be treated with high efficiency and low overall power consumption.

The gas mixture may be delivered to a treatment chamber enclosing the electrodes with dielectric material input and output ports, may be enclosed in a containment vessel surrounding a dielectric material supply reel and dragged in a layer along with the dielectric material at high speed, or may be delivered without an enclosed vessel directly to the surface between the first and second electrodes with a dielectric sponge gas distributor. Treatment vessels may be adapted to receive dielectric covered wire, dielectric tubes or rods and dielectric sheets or film.

The surface discharge process produces intense electromagnetic radiation immediately adjacent to the surface, and causes ion and electron bombardment of the dielectric surface, improving wettability and adhesion to the dielectric material surface. At high power, surface melting permits dielectric layers to be bonded together.

BEST MODE FOR CARRYING OUT THE INVENTION

Figure 1:
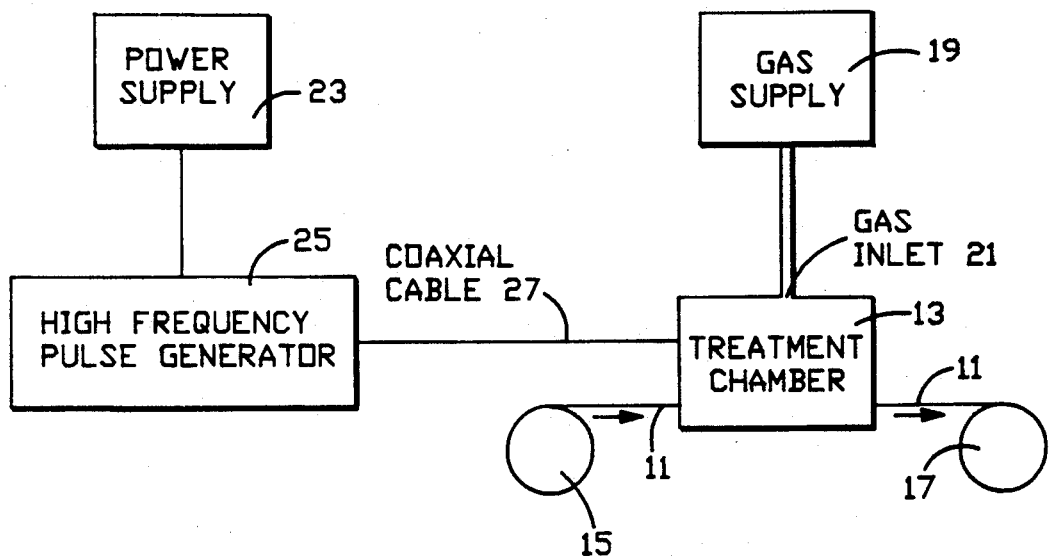
FIG. 1 is a schematic block diagram of a surface discharge apparatus of the present invention for carrying out surface treatment of dielectric materials.

With reference to FIG. 1, an apparatus for treating a surface of a dielectric material 11 includes a treatment chamber 13 inside of which the material 11 is treated. A material supply reel 15 supplies the dielectric material 11 to the treatment chamber 13, while a material take-up reel 17 receives the treated material 11 from the treatment chamber 13. The treatment chamber 13 is given a specified gaseous environment by a gas supply 19 supplying gas through a gas inlet 21 of the treatment chamber. Typically, an inert gas or gas mixture, such as argon, is used, but reactive gases and gaseous monomer constituents could also be supplied in a gas mixture containing mostly inert gases. The gaseous environment is approximately at atmospheric pressure (0.1 MPa) or slightly higher.

Figure 2:
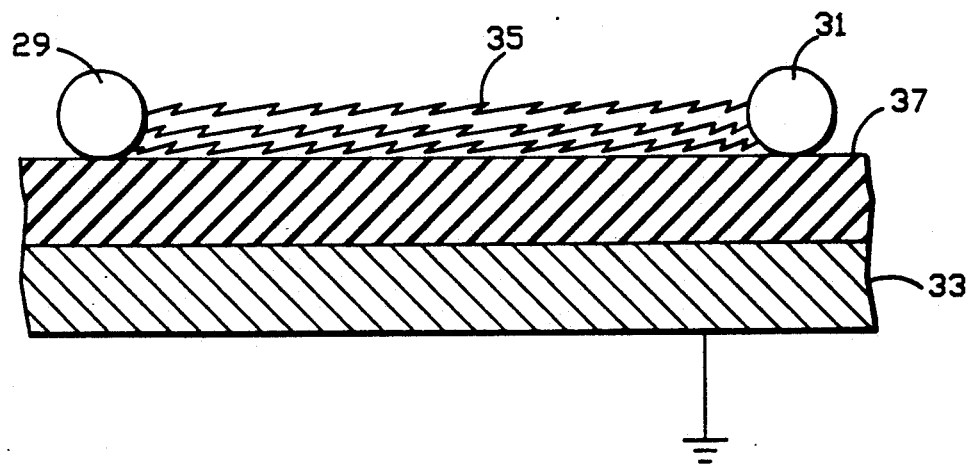
FIG. 2 is an expanded sectional view of a portion of the treatment chamber in the apparatus of FIG. 1, illustrating the production of a surface discharge adjacent to a dielectric material surface.

The apparatus includes a power supply 23 capable of supplying electrical power. A pulse generator 25 is connected to the power supply 23 and supplies repeated electrical pulses with a voltage that exceeds a breakdown voltage of the gaseous environment in the treatment chamber 13. Typically, such pulse voltages are in a range from 1 to 20 kV, but could range from 0.1 to 50 kV. The pulse generator 25 typically has charging resistors or chokes connecting the power supply 23 to a supply capacitor with sufficient capacitance to achieve the necessary pulse energy, and a switch for repeatedly discharging the capacitor over a coaxial cable 27 through a load. As seen in FIG. 2, the load comprises a pair of parallel spaced apart electrodes 29 and 31 positioned inside the treatment chamber 13 adjacent to the dielectric material 11 to be treated with the gaseous environment between the electrodes 29 and 31. The electrodes 29 and 31 barely make contact with a surface 37 of the dielectric material 11. The electrical pulses generate a pulsed surface discharge 35 adjacent to the surface 37 of the dielectric material 11 each time the switch of the pulse generator 25 is closed.

The discharge 35 takes the form of a uniformly distributed high density plasma of ionized gas in contact with the surface 37 of the dielectric material, the electrical current of positive ions and negative electrons flowing in opposite directions generally parallel to the surface 37 from one electrode to the other. This discharge produces bombardment of the surface 37 with excited gas, gas ions, electrons and intense flashes of electromagnetic radiation, including particularly the extremely energetic ultraviolet part of the spectrum, that breaks surface bonds of the dielectric material 11, modifying the surface 37, and in the case of reactive gas mixtures causes chemical changes of the surface material. This discharge is a surface effect, rather than a volume effect with high energy density located immediately adjacent to surface 37 with low average power consumption overall. The discharge 35 is an areawise effect, distributed over a width corresponding to the length of the electrodes 29 and 31, and over a length equal to the separation between the electrodes 29 and 31, rather than a concentrated arc discharge. To ensure uniform distribution of the discharge a conductive backing 33, such as of a metal material, is provided separated from the area between the electrodes 29 and 31 by a dielectric material which can be the same material 11 as that being treated. The backing 33 provides a homogeneous surface voltage distribution.

The discharge 35 is preferably switched by the pulse generator 25 at high repetitive rates. Typical pulse repetition rates range from 100 to 500 Hz, but could range from a single pulse (0 Hz) up to 10 kHz. Radiation gives the discharges the appearance of an essentially uniform glow at such high rates. At such rates, the insulating material 11 may be transported from reel 15 to reel 17 past electrodes 29 and 31 at high speed. Speeds through the treatment chamber 13 typically range from 0.5 to 2.5 ms$^{-1}$, that is, approximately 5 mm of material movement per discharge pulse. With a typical electrode spacing of approximately 5 cm, each portion of the dielectric surface is treated with about 10 pulsed discharges. However, speeds could range from 0.01 to 300 ms$^{-1}$.

Figure 3:
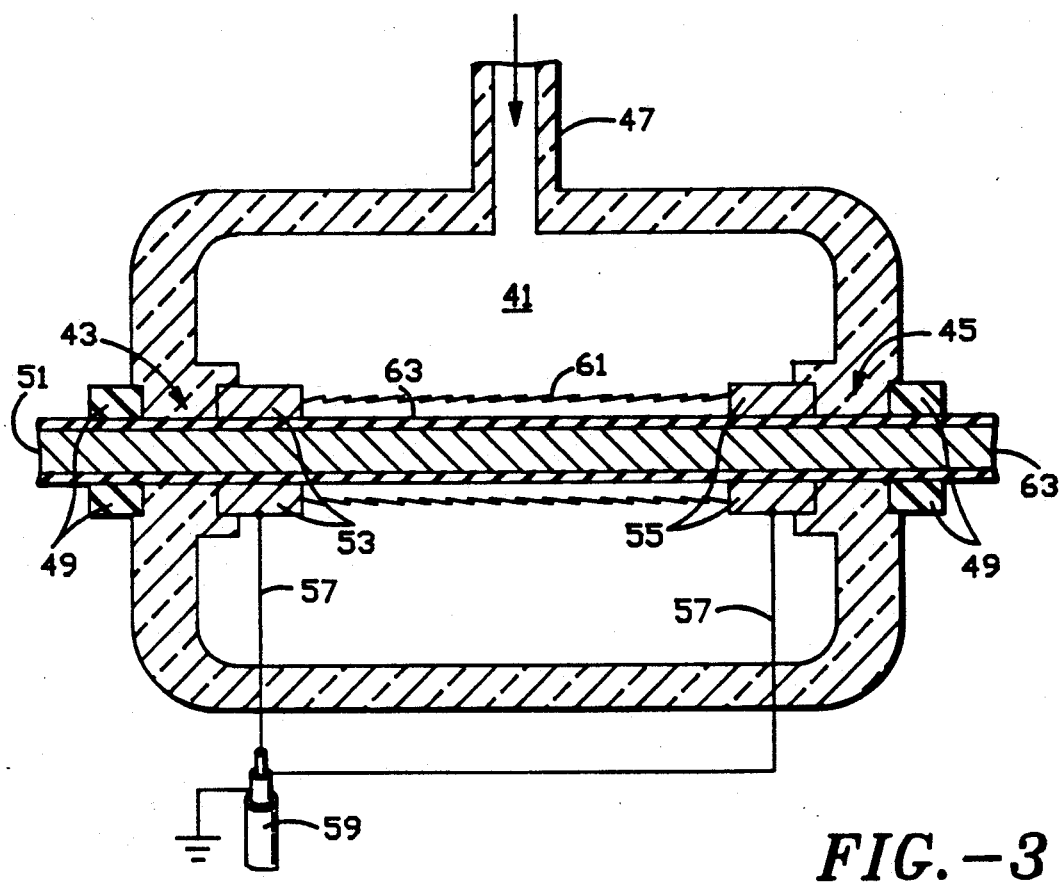
FIG. 3 is a side sectional view of a treatment chamber for use in the apparatus of FIG. 1 for treating dielectric covered conductive wires.

With reference to FIG. 3, an apparatus for the treatment of dielectric surfaces 63 with a conductive core 51, such as wire insulation, has a treatment chamber in the form of a gas vessel 41 with a wire inlet port 43, a wire exit port 45 and a gas inlet port 47. A pair of gas seals 49 bound the openings of the ports 43 and 45 to minimize the amount of gas flowing into or out of the treatment chamber 41 as an insulated wire 51 is pulled through the ports 43 and 45 of the chamber 41. The treatment chamber 41 may also be maintained at a pressure equal or above the ambient atmospheric pressure outside the chamber by allowing gas to flow slowly into the chamber 41 through gas inlet 47 and out through the ports 43 and 45 at the gas seals 49.

The electrodes 53 and 55 in the wire treatment chamber 41 are annular electrodes with their center openings aligned with the openings of the ports 43 and 45, such that the wire 51 and its insulation cover 63 can pass through the center openings of the annular electrodes 53 and 55. The electrodes are connected via wire leads 57 to the coaxial cable 59 from a pulse generator. The resulting surface discharge 61 is an annular one that envelopes the entire outer surface of the insulative covering 63 in the region between the electrodes 53 and 55. The conductive wire core 51 serves as the conductive backing for the dielectric cover 63 in this embodiment to provide a high distributed load capacitance and uniform current distribution within the discharge 61. The wire center may either be grounded to a fixed potential relative to one electrode or may be allowed to float.

Figure 4:
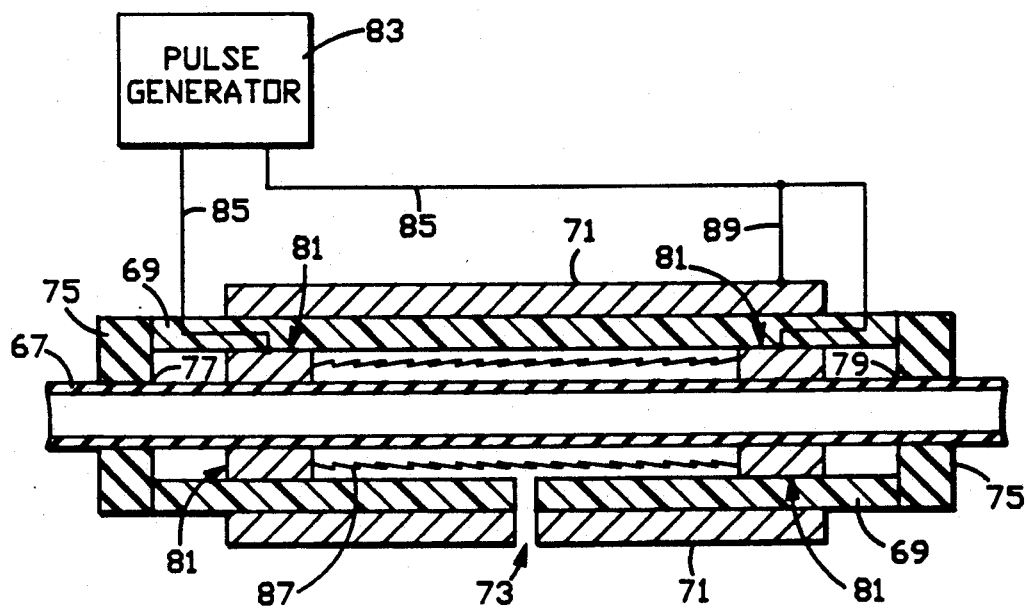
FIG. 4 is a side sectional view of a treatment chamber for use in the apparatus of FIG. 1 for treating dielectric rods or tubes.

With reference to FIG. 4, another treatment chamber 69 is shown that is adapted for treatment of an insulated rod or tube 67. The treatment chamber is a dielectric tube 69, very similar to that shown in FIG. 3 for wires, except that an electrically conductive tube 71 is provided on the outside of the dielectric tube 69 because the insulated rod or tube 67 lacks a conductive core to serve as a capacitive backing. As before, a gas inlet 73 to the chamber 69 supplies a gaseous environment at or slightly above atmospheric pressure while gas seals 75 keep an excess amount of the gas from leaking out of the inlet and output ports 77 and 79 through which the rod or tube 67 being treated travels. Annular electrodes 81 are spaced apart and aligned with the openings 77 and 79 so that the rod or tube 67 passes through the central openings of the annular electrodes 81. The electrodes 81 are connected to a pulse generator 83 via conductive lines 85, such as a coaxial cable. High voltage pulses from the generator 83 which exceed the breakdown voltage of the gas admitted through the inlet 73 produce a discharge 87 of ionized gas between the electrodes 81. The current in the discharge generally flows parallel to the surface of the dielectric rod or tube 67 to be treated. Because the conductive tube 71 is on the outside of treatment chamber 69, the discharge is normally found immediately adjacent to the inside diameter of the dielectric tube forming the treatment chamber 69. Accordingly, this inside diameter preferably is made only slightly larger than the outer diameter of dielectric rod or tube 67 to be treated, so that the discharge is as close to the treatment surface as possible. The difference in the two diameters should not be more than several millimeters. The conductive backing 71 may be grounded to a fixed potential, such as by wire 89 to one of the electrodes 81, or its potential may be allowed to float.

Figure 5:
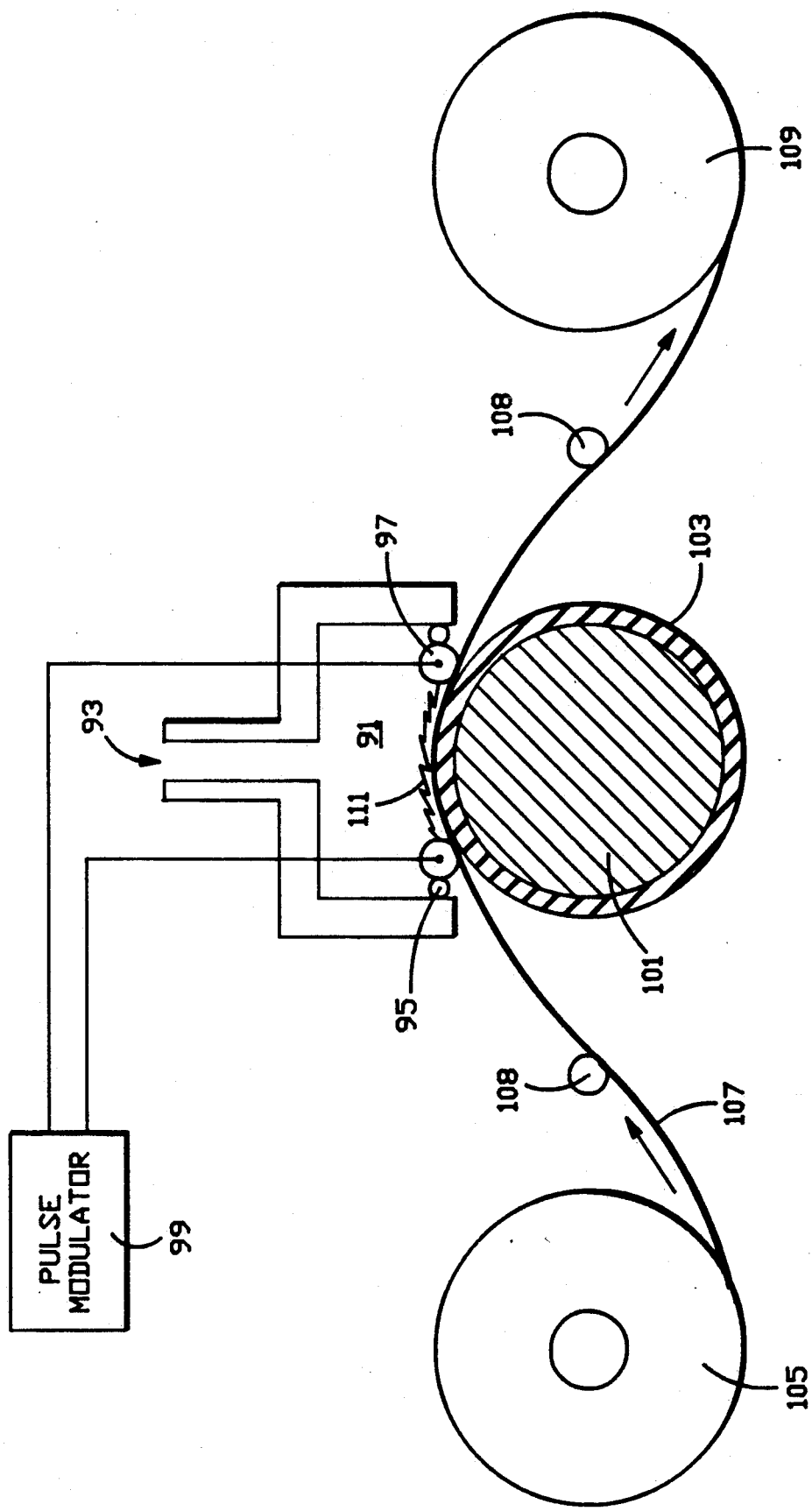
FIG. 5 is a side sectional view of a surface discharge apparatus of the present invention for treating the surface of a dielectric sheet or film.

With reference to FIG. 5, an apparatus for treating dielectric material in the form of a thin continuous sheet, film or web includes a gas containment vessel 91 having a gas inlet 93 for receiving a supply of a gas or gas mixture and gas seals 95 between the walls of the vessel 91 and a pair of roller electrodes 97 to prevent rapid loss of the supplied gaseous environment. The electrodes 97 are spaced apart and connected to a pulse generator 99. The conductive backing for the dielectric film material 107 to be treated is in the form of a grounded metal roller or drum 101 with an insulative surface coating 103. A supply reel 105 provides the insulative film 107 to the treatment area between drum 101 and roller electrodes 97, while a take-up reel 109 receives the treated material. Guide rollers 108 may be used to ensure proper tension against drum backing 101. The reels 105 and 109 move the film 107 past the roller electrodes 97 at high speed, at least 0.5 ms$^{-1}$ and preferably up to 3.0 ms$^{-1}$, while a surface discharge 111 is created in the gaseous environment between electrodes 97 by the application of high voltage pulses to the electrodes 97 by pulse generator 99. The wide surface area of the discharge 111 means that areas of up to 1000 cm$^2$ and larger can be treated with each pulse.

In operation, a surface discharge occurs when a fast rising electrical pulse is applied to two electrodes in contact with a dielectric surface. One of the electrodes, usually the grounded one, normally is in electrical contact with a conductive backing element located on the other side of a dielectric, usually the material to be treated. It is well known that electric breakdown voltage of gas close to any dielectric surface is 5-10 times lower than the electric breakdown voltage of a gas volume. It is also well known that homogeneous volume electrical discharges contract to filaments at pressures above 1-100 torr. Only in inert gases can homogeneous electric volume discharges be maintained at amtospheric pressure (for small distance between discharge electrodes). In the case of surface discharge at atmospheric pressure in inert gases, it is possible to maintain homogeneous surface discharge for larger spacing between electrodes than in the case of volume discharge. This homogeneous surface discharge can be maintained only for homogeneous distribution of discharge voltage on the surface. The conductive backing provides a distributed capacitance that homogeneously distributes discharge voltage on the surface which helps to establish a uniformly distributed discharge. The rise time of the voltage pulses should be less than the time of destruction of homogeneous voltage distribution due to formation of conductive discharge filaments on the surface. The rise time of the voltage pulses should be shorter than the rise time of discharge currents through these filaments. Because of high inductance of the initial discharge filaments for discharge pulse rise time shorter than 10$^{-6}$ sec and distributed capacitor on the surface of dielectric with $\sim \epsilon > 2$—and thickness d 1-2 mm—the time of formation of homogeneous discharge on the surface is shorter than the time of contraction of discharge into multifilaments form the empirical relationships between rise time $\tau_R$ of the pulse, voltage V and parameters of dielectric for successful formation of homogeneous surface discharge in inert gas atmosphere is shown below.

$$\tau < A \frac{U \cdot E}{d \cdot 1}$$

$$\tau < K \cdot \frac{V}{L} \cdot \frac{E}{d}$$

The constant value K depends on the nature of the inert gas and the dielectric substrate. $K \approx 10^{11}$ sec $\times$ cm$^2$/V for argon atmospheric pressure and alumina dielectric substrate.

The discharge process excites and ionizes the gas due to collisions of electrons with gas atoms and molecules in the electric field between the electrodes. The discharge thereby treats the dielectric surface with a bombardment of ions and electrons and an intense electromagnetic radiation. Available energies in the surface discharge are up to 10 eV for electrons, up to 2 eV for ions and up to 10 eV for UV radiation.

| bond | energy |
| --- | --- |
| C=O | 8.0 eV |
| C=C | 6.1 eV |
| C—C | 3.4 eV |
| C—F | 4.4 eV |
| C—H | 4.3 eV |
| C—Cl | 3.4 eV |
| C—N | 2.9 eV |

Thus the insulating surface exposed to the surface discharge undergoes an activation process involving the breaking of surface bonds, producing polar molecular sites, and thereby causing greatly increased surface tension of the material (e.g., >73 D/cm for polytetrafluoroethylene) and increased wettability to many liquid materials (water, alcohol, inks, etc.). One application for this process is preparing the insulative coatings of wires and other dielectric surfaces for printing with ink.

When reactive gases, such as fluorine, hydrogen, oxygen, nitrogen, ammonia, water, carbon monoxide and others, are included in the gas mix, free radicals are formed in the discharge by the removal of one or more atoms from a gas molecule. These free radicals are capable of chemically modifying the dielectric surface by adding atoms or free radical portions of the gas molecules onto the surface of the dielectric material. This can lead to cross-linking in a polymer surface or even to degradation of a polymer material surface. This positive incorporation of atoms to the dielectric surface contrasts with the passive nature of the modifications achieved by treatment with completely inert gases and inert gas mixtures. Note that some gases, such as nitrogen, which are often considered to be nonreactive under ordinary conditions become quite reactive under the plasma conditions in a surface discharge. When reactive gases are used in a gas mixture, a high percentage (typically, about 99%) of inert gas is usually required for a uniform discharge on the treatment surface. Accordingly, ultraviolet radiation from the inert gas in the mix also contributes to the surface treatment. Some reactive gases, such as oxygen, fluorine and ammonia, also produce irradiation effects. Extremely energetic far ultraviolet radiation may be produced by the formation and radiative decay of excimers, such as argon dimers or argon fluoride excimers, in the discharge.

An advantage of the surface discharge treatment is limitation of the modifications to very thin layers at the surface. The effects of electromagnetic irradiation, for example, are generally limited to a depth of at most 10 $\mu$m. Because of the relatively high energy of the reactive species created in the discharge, nearly all polymers, regardless of their conventional reactivity under ordinary conditions, can be modified by the treatment. Materials that can be treated by a surface discharge include polyethylene, polyesters such as Mylar, polyvinylchloride, polypropylene, polyimides such as Kapton, silicones, polytetrafluoroethylenes such as Teflon or FEP and copolymers with hexafluoropropylene. By choosing the types of gases to be used, the nature of the modification can be varied. Surface modification, including some localized sputtering, by the bombardment of fast ions and electrons can result in the adherence of adhesive materials to some polymers, such as polyesters and polytetrafluoroethylenes, that ordinarily would not be susceptible to such bonding. This effect is useful in bonding insulating layers together, such as to form composites. Metal coatings can be deposited onto polymers by this technique.

At higher energy levels, the dielectric material absorbs nearly all of the energy available from the discharge, causing melting of the polymer surface. This effect is useful in bonding two or more insulating layers together to form multilayer coatings or laminations. For example, in a wire wrapped in a tape of insulating material, the rapid fusion of the layers will result in a solid insulation that hermetically seals the wire. A pulsed power flux per unit surface area of up to 1 MW/cm$^2$ is available in a surface discharge. At a repetition rate of 500 Hz and a pulse length of 2 $\mu$s, 1 kW/cm$^2$ of average power is available for this purpose on the moving surface.

A surface discharge can also initiate plasma-induced polymerization of certain monomers present in the gas mixture. This effect is useful for causing graft polymerization of one polymer onto another. The process is essentially the same as plasma (or plasma-assisted) chemical vapor deposition (CVD) used primarily for depositing inorganic material, but here used to deposit the organic monomer molecules onto the dielectric surface exposed to the discharge. The deposited material generally has the characteristics of a polymer, although the reaction mechanisms in the discharge are different from conventional polymerization reactions. Most organic components, organosilicons and organometallic compounds can be used for this purpose, provided the surface treatment is sufficient to ensure adequate adhesion of the polymeric deposition. Separate surface conditioning, deposition and curing steps are generally not required with surface discharge type polymer grafting. Crosslinking of the polymer chains are generally more thorough than ordinary polymerization processes.

Figure 6:
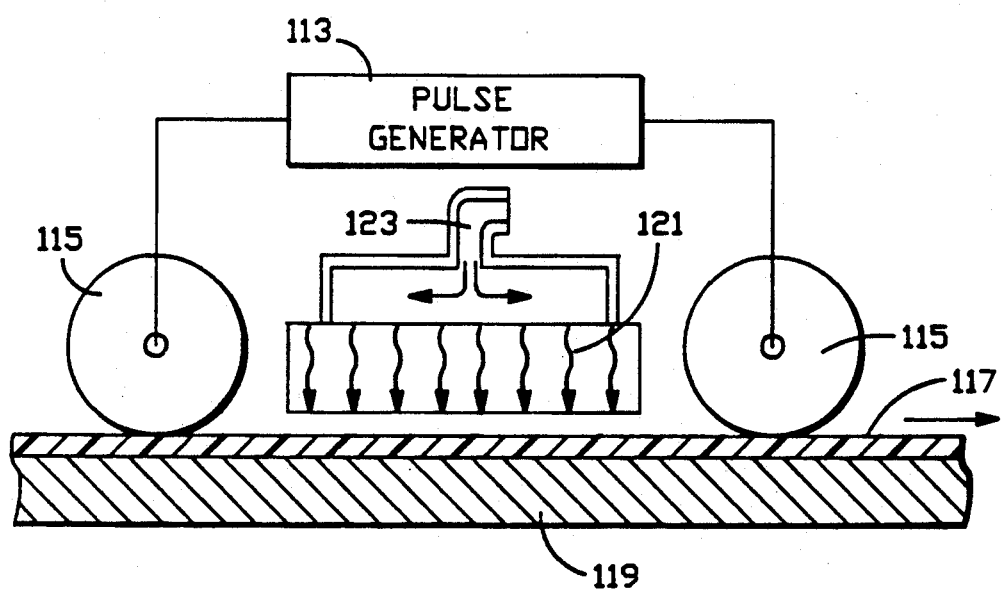
FIG. 6 is a side sectional view of a surface discharge portion, analogous to FIG. 2, of an apparatus of the present invention for carrying out surface treatment of dielectric materials, which lacks an enclosed treatment chamber.

With reference to FIG. 6, a treatment chamber is not essential as long as the environment immediately adjacent to the dielectric surface 117 to be treated in the space between the pair of electrodes 115 where the pulsed discharge takes place is an inert gas. In FIG. 6, a grounded conductive plate 119 is used as a backing for the dielectric material 117 to provide distributed load capacitance, as described previously for other embodiments. A pulse generator 113 provides an electrical potential across the parallel roller electrodes 115 which is sufficient to cause breakdown of the desired inert gas medium, but preferably not to cause breakdown of the more reactive atmosphere away from the dielectric material surface 117 to be treated. Gas is distributed to the dielectric material surface 117 by a porous dielectric material or "sponge" 121 positioned over nearly the entire area between the electrodes 115 across which the discharge is to take place. A gas inlet 123 delivers the gaseous medium from a supply to the sponge 121. More conventional areawise gas manifolds could also be used, but the gas distribution should be nearly uniform for a uniform discharge to take place. Three dimensional objects may be treated in this manner.

Figure 7:
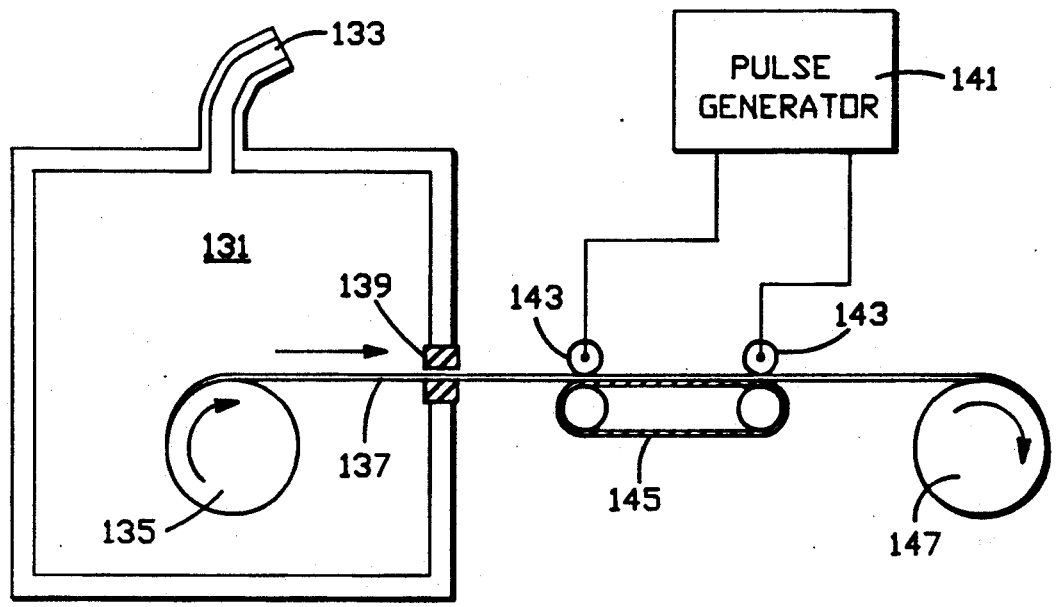
FIG. 7 is a side sectional view of a surface discharge apparatus of the present invention including a gas containment vessel surrounding a dielectric material supply reel and employing gas drag.
Figure 8:
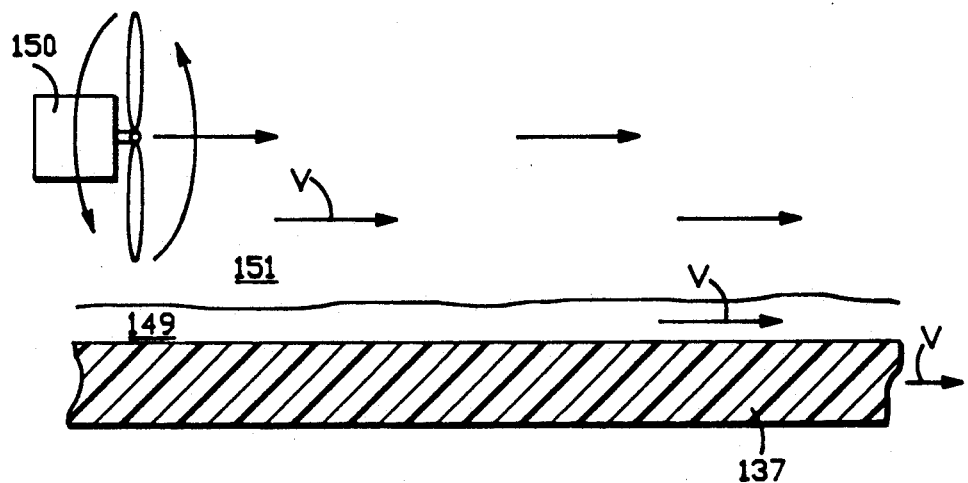
FIG. 8 is an enlarged side sectional view of dielectric material outside the gas containment vessel in FIG. 7, illustrating gas drag and turbulence reducing means.
Figure 9:
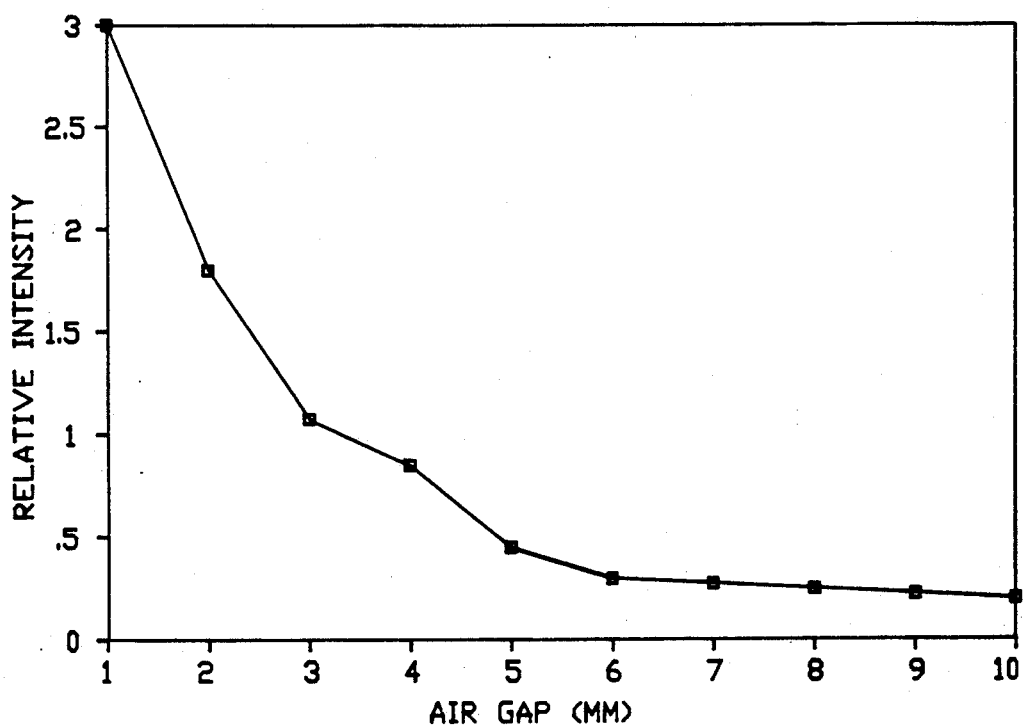
FIG. 9 is a graph of reactive treatment efficiency versus discharge gap.

With reference to FIG. 7, at the high processing speeds (at least 0.5 m/s) of the embodiments in FIGS. 1-5, the moving dielectric material to be treated tends to drag air into the treatment chamber along with it. This can cause the inert gas mixture to lift off of the dielectric surface. As seen in FIG. 9, the treatment efficiency varies with the distances with which the discharge is spaced above the treated surface (the discharge gap), such that efficiency declines substantially for increase in the discharge gap. Discharge homogeneity is also affected adversely by lifting. One embodiment that minimizes this problem, seen in FIG. 7, has a gas containment vessel 131 which is supplied a desired gas environment via a gas inlet 133. A supply reel 135 containing a dielectric material 137 to be treated, such as a coated wire or a film material, is located within the gas containment vessel 131. The dielectric material 137 leaves the vessel 131 at high speed through an exit port 139 carrying a layer of the gas mixture along with it on its surface. A pulse generator 141 supplies a voltage exceeding a breakdown voltage of the gas layer to electrodes 143 adjacent to which the dielectric material 137 with its gas layer passes. A pulsed discharge is thus created immediately adjacent to dielectric material 137 between electrodes 143 in the gas layer. A grounded metal backing belt electrode 145 with high load capacitance ensures uniform surface discharge distribution over the discharge area. The treated material 137 is collected by a take-up reel 147. For control over the thickness of the gas layer and to minimize excessive gas loss from the vessel 131, gas seals may be provided around the exit port 139 with just enough room for the dielectric material 137 and its gas layer. Further, as shown in FIG. 8, well known means 150, such as a fan or gas jets, may be provided to force air 151 to move with the dielectric material 137 and gas layer 149 at approximately equal velocities, as represented by arrows V. This minimizes turbulence and allows for thicker gas layers 149 to exist on the surface 137 to be treated.

What is claimed is:

1. An apparatus for dielectric material surface treatment comprising, a treatment chamber having first and second electrodes spaced apart in said treatment chamber, a gas inlet and means for receiving a dielectric material to be treated and for positioning a front surface of said dielectric material parallel to both of said first and second electrodes, said treatment chamber further having a third electrode parallel to a back surface of said dielectric material, said third electrode being at substantially the same electrical potential as one of said first and second electrodes, transport means for supplying said dielectric material to said receiving and positioning means of said treatment chamber and for receiving treated dielectric material therefrom, means for supplying a gas to said treatment chamber through said gas inlet, and means connected to an electrical power supply for supplying repeated pulses with a voltage exceeding a breakdown voltage of said gas to said electrodes with pulse duration less than $10^{-5}$ sec such that a uniformly distributed surface discharge is produced between said first and second electrodes parallel to said front surface of said dielectric material, whereby said third electrode serves to attract said discharge to said surface of said dielectric material.

2. The apparatus of claim 1 wherein said treatment chamber is an enclosed cell maintained near atmospheric pressure, said receiving and positioning means including opposed inlet and outlet openings in said cell with annular gas seals about said openings adapted to receive dielectric material with a cylindrical outer surface and a conductive core, said third electrode comprising said conductive core, said first and second pair of electrodes being annular electrodes aligned with said openings, whereby said dielectric material can pass through said annular gas seal about said inlet opening, through said inlet opening, through said annular electrodes, through said outlet opening and through said gas seal about said outlet opening, and whereby said surface discharge envelops the entire cylindrical outer surface of said dielectric material between said annular electrodes.

3. The apparatus of claim 2 wherein said dielectric material with said cylindrical outer surface comprises a dielectric covered conductive wire.

4. The apparatus of claim 1 wherein said third electrode is a backing of conductive material that is grounded to a fixed electrical potential, said receiving and positioning means being formed by said backing being closely spaced apart from said first and second electrodes such that a dielectric film material to be treated can pass within gaps formed between said backing and each of said first and second electrodes, whereby said dielectric material contacts said electrodes and said backing.

5. The apparatus of claim 4 wherein said backing and said electrodes are rollers that are rotatable about fixed axes in response to transport of said dielectric film material therebetween.

6. The apparatus of claim 1 wherein said gas is an inert gas.

7. The apparatus of claim 6 wherein said gas contains argon.

8. The apparatus of claim 1 wherein said gas contains a reactive gas component.

9. The apparatus of claim 1 wherein said gas contains a monomer.

10. The apparatus of claim 1 wherein said repeated pulses occur at a rate within a range from single pulse to 10 kHz.

11. The apparatus of claim 1 wherein said pulses have a voltage in a range from 0.1 to 50 kV.

12. The apparatus of claim 1 wherein said transport means moves said dielectric material past said electrodes at a speed within a range of 0.01 to 300 ms$^{-1}$.

13. An apparatus for dielectric material surface treatment comprising, a pair of spaced apart electrodes, one electrode of said pair being grounded to a fixed electrical potential, a backing of conductive material that is grounded to said fixed electrical potential, said backing being closely spaced apart from said electrodes with a gap formed between each of said electrodes and said backing, transport means for supplying a dielectric material to be treated such that said dielectric material passes through said gaps between said electrodes and said backing, whereby said dielectric material contacts said electrodes and said backing, means for placing a gas in contact with a surface of said dielectric material opposite to said backing, and means connected to an electrical power supply for supplying repeated pulses with a voltage exceeding a breakdown voltage of said gas to said electrodes with a pulse duration less than $10^{-5}$ sec such that a uniformly distributed surface discharge is produced in said gas between said electrodes parallel to said surface of said dielectric material, whereby said third electrode serves to attract said discharge to said surface of said dielectric material.

14. The apparatus of claim 13 wherein said gas placement means comprises a manifold adapted to distribute said gas over a wide area of said surface of said dielectric material to be treated, said manifold positioned between said electrodes and having a gas inlet for receiving gas from a supply.

15. The apparatus of claim 13 wherein said gas placement means comprises a gas containment vessel having a gas inlet for receiving gas from a supply and positioned about a portion of said transport means from which said dielectric material to be treated is supplied, motion of said dielectric material causing a layer of said gas in contact with said surface of said dielectric material to be dragged along with said dielectric material.

16. A method of treating a dielectric material surface comprising providing a supply of dielectric material having a front surface to be treated and a back surface, transporting said dielectric material past a first and second spaced apart electrodes and a third electrode, said first and second electrodes being parallel to and on the same side of said front surface to be treated, said third electrode being parallel to the back surface of said dielectric material, said third electrode having substantially the same electrical potential as one of said first and second electrodes, supplying an environment of substantially inert gas parallel to said front surface between said first and second electrodes, and applying repeated electrical pulses of a voltage exceeding a breakdown voltage of said inert gas across said first and second electrodes with a pulse duration less than $10^{-5}$ sec, whereby a uniformly distributed gas discharge is produced parallel to said front surface of said dielectric material between said first and second electrodes, whereby said third electrode serves to attract said discharge to said front surface of said dielectric material, intense electromagnetic irradiation and electron, ion and excited gas bombardment of said front surface causing treatment of said dielectric material surface as it is transported past said electrodes.

17. The method of claim 16 wherein reactive gases are also supplied in said environment of substantially inert gas.

18. The method of claim 16 wherein gaseous monomers are also supplied in said environment of substantially inert gas.

19. The method of claim 16 wherein supplying said environment includes enclosing said electrodes in a treatment chamber, said chamber having a gas inlet receiving said substantially inert gas, and entrance and exit apertures receiving and directing said dielectric material to be treated past said electrodes within said chamber.

20. The method of claim 16 wherein supplying said environment comprises directing a flow of said substantially inert gas against said front surface to be treated between said first and second electrodes.

21. The method of claim 16 wherein supplying said environment comprises enclosing said supply of dielectric material to be treated in a gas vessel and supplying said substantially inert gas to said gas vessel, said gas vessel having an exit port for said dielectric material to be treated, said dielectric material to be treated dragging a layer of said gas with it along its surface past said first and second electrodes.

22. An apparatus for dielectric material surface treatment comprising,
a treatment chamber having first and second electrodes spaced apart in said chamber, a gas inlet and means for receiving a first dielectric material to be treated and for positioning a surface of said first dielectric material parallel to both of said first and second electrodes, said treatment chamber further having a second dielectric material with a front surface parallel to said first and second electrodes such that said first and second electrodes are between said first dielectric material and said second dielectric material, said treatment chamber further having a third electrode parallel to a back surface of said second dielectric material, said third electrode having substantially the same electrical potential as one of said first and second electrodes,
transport means for supplying said first dielectric material to said receiving and positioning means of said treatment chamber and for receiving treated dielectric material therefrom,
means for supplying a gas to said chamber through said gas inlet, and
means connected to an electrical power supply for supplying repeated pulses with a voltage exceeding a breakdown voltage of said gas to said electrodes with pulse duration less than $10^{-5}$ sec such that a uniformly distributed surface discharge is produced between said first and second electrodes parallel to said front surface of said second dielectric material, whereby said third electrode serves to attract said discharge to said front surface of said second dielectric material.

23. The apparatus of claim 22 wherein said treatment chamber is an enclosed cell maintained near atmospheric pressure, said receiving and positioning means including opposed inlet and outlet openings in said cell with annular gas seals about said openings adapted to receive said first dielectric material with a cylindrical outer surface, said first and second electrodes being annular electrodes aligned with said openings, whereby said first dielectric material can pass through said annular gas seal about said inlet opening, through said inlet opening, through said annular electrodes, through said outlet opening and through said gas seal about said outlet opening, and whereby said surface discharge envelops the entire cylindrical outer surface of said first dielectric material between said first and second annular electrodes.

24. The apparatus of claim 23 wherein said third electrode is a tube of conductive material enclosing the outside of said enclosed cell, said tube being grounded to a fixed electrical potential.

25. The apparatus of claim 24 wherein said first dielectric material with said cylindrical outer surface comprises a dielectric rod.

26. The apparatus of claim 24 wherein said first dielectric material with said cylindrical outer surface comprises a dielectric tube.

27. The apparatus of claim 22 wherein said gas is an inert gas.

28. The apparatus of claim 27 wherein said gas contains argon.

29. The apparatus of claim 22 wherein said gas contains a reactive gas component.

30. The apparatus of claim 22 wherein said gas contains a monomer.

31. The apparatus of claim 22 wherein said repeated pulses occur at a rate within a range from single pulse to 10 kHz.

32. The apparatus of claim 22 wherein said pulses have a voltage in a range from 0.1 to 50 kV.

33. The apparatus of claim 22 wherein said transport means moves said dielectric material past said electrodes at a speed within a range of 0.01 to 300 ms$^{-1}$.

34. A method of treating a dielectric material surface comprising,
providing a first dielectric material having a surface to be treated,
transporting said first dielectric material past first and second spaced apart electrodes, a second dielectric material and a third electrode, said transporting being such that said first and second electrodes are parallel to and between said surface to be treated and a front surface of said second dielectric material with the third electrode parallel to the back surface of said second dielectric material,
providing said third electrode with substantially the same electrical potential as one of said first and second electrodes,
supplying an environment of substantially inert gas parallel to said front surface between said first and second electrodes, and
applying repeated electrical pulses of a voltage exceeding a breakdown voltage of said inert gas across said first and second electrodes with a pulse duration less than $10^{-5}$ sec, forming a uniformly distributed gas discharge parallel to said surface of said second dielectric material between said first and second electrodes, whereby said third electrode serves to attract said discharge to said front surface of said second dielectric material, intense electromagnetic irradiation and electron, ion and excited gas bombardment of said surface of said first dielectric material causing treatment of said surface of said first dielectric material as it is transported past said first and second electrodes.

35. The method of claim 34 wherein reactive gases are also supplied in said environment of substantially inert gas.

36. The method of claim 34 wherein gaseous monomers are also supplied in said environment of substantially inert gas.

37. The method of claim 34 wherein supplying said environment includes enclosing said electrodes in a treatment chamber, said chamber having a gas inlet receiving said substantially inert gas, and entrance and exit apertures receiving and directing said dielectric material to be treated past said electrodes within said chamber.

38. The method of claim 34 wherein supplying said environment comprises directing a flow of said substantially inert gas against said front surface to be treated between said first and second electrodes.

39. The method of claim 34 wherein supplying said environment comprises enclosing said supply of dielectric material to be treated in a gas vessel and supplying said substantially inert gas to said gas vessel, said gas vessel having an exit port for said dielectric material to be treated, said dielectric material to be treated dragging a layer of said gas with it along its surface past said first and second electrodes.

* * * * *